US009682607B2

(12) United States Patent
Han et al.

(10) Patent No.: US 9,682,607 B2
(45) Date of Patent: Jun. 20, 2017

(54) AIR CONDITIONER FOR VEHICLE

(75) Inventors: Seong Seok Han, Daejeon (KR); Seong Hyun Kim, Daejeon (KR); Dong Gyun Kim, Daejeon (KR); Hyung Joo Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 315 days.

(21) Appl. No.: 14/127,819

(22) PCT Filed: Jun. 26, 2012

(86) PCT No.: PCT/KR2012/005022
§ 371 (c)(1),
(2), (4) Date: Dec. 19, 2013

(87) PCT Pub. No.: WO2013/002529
PCT Pub. Date: Jan. 3, 2013

(65) Prior Publication Data
US 2014/0124161 A1 May 8, 2014

(30) Foreign Application Priority Data

Jun. 30, 2011 (KR) .................. 10-2011-0064157
Jun. 26, 2012 (KR) .................. 10-2012-0068390

(51) Int. Cl.
*B60H 1/00* (2006.01)

(52) U.S. Cl.
CPC ......... *B60H 1/00007* (2013.01); *B60H 1/005* (2013.01); *B60H 1/00335* (2013.01); *B60H 1/00492* (2013.01)

(58) Field of Classification Search
CPC ...... B60H 1/00492; B60H 1/005; B60H 1/02; B60H 1/04; B60H 1/06; B60H 1/08; B60H 1/10; B60H 1/12
See application file for complete search history.

(56) References Cited

U.S. PATENT DOCUMENTS

| 4,761,967 A * | 8/1988 | Sumikawa et al. ............. 62/201 |
| 6,986,385 B1 * | 1/2006 | Gilles et al. .................. 165/202 |

(Continued)

FOREIGN PATENT DOCUMENTS

| CN | 101445031 A | 6/2009 |
| DE | 103 49 291 A1 | 5/2004 |

(Continued)

OTHER PUBLICATIONS

Machine Translation for JP 2004142551.*

*Primary Examiner* — Jianying Atkisson
*Assistant Examiner* — Antonio R Febles
(74) *Attorney, Agent, or Firm* — Norton Rose Fulbright US LLP

(57) ABSTRACT

Disclosed therein is an air conditioner for a vehicle, which includes an evaporator and a heater core mounted inside an air-conditioning case along an air flow direction in order; and a storage tank on which the evaporator is mounted, wherein the storage tank has a surface contact part carrying out heat exchange of the heat carrier, wherein the evaporator is in surface contact with the storage tank at the surface contact part. The air conditioner further includes a heat-exchanger mounted inside the storage tank exchanging heat between refrigerant circulating the evaporator and the heat carrier (cooling water) stored in the storage tank.

12 Claims, 12 Drawing Sheets

(56) References Cited

U.S. PATENT DOCUMENTS

| | | | |
|---|---|---|---|
| 7,210,305 B2* | 5/2007 | Shin | 62/285 |
| 8,272,432 B2 | 9/2012 | Major et al. | |
| 2006/0016582 A1* | 1/2006 | Hashimoto et al. | 165/109.1 |
| 2009/0133415 A1 | 5/2009 | Major et al. | |

FOREIGN PATENT DOCUMENTS

| | | |
|---|---|---|
| JP | 09-323532 A | 12/1997 |
| JP | 2000-318431 A | 11/2000 |
| JP | 2004-142551 A | 5/2004 |
| JP | 2007-113904 A | 5/2008 |
| KR | 1020110034736 A | 4/2011 |
| WO | 2008/025916 A1 | 3/2008 |

* cited by examiner

Prior Art

AIR CONDITIONER FOR VEHICLE

BACKGROUND OF THE INVENTION

Field of the Invention

The present invention relates to an air conditioner for a vehicle, and more particularly, to an air conditioner for a vehicle, which includes and evaporator and a storage tank storing a heat carrier exchanging heat with the evaporator so as to accumulate cold air or warm air.

Background Art

Recently, releases of hybrid cars or idle-stop cars have been rapidly increased as measures for improvement of fuel efficiency and as countermeasures on environmental pollution according to the exhaust gas emission regulations.

In case of the hybrid cars or the idle-stop cars, engines are automatically stopped when they come to stop due to waiting for signal, but they have a problem in that a compressor for a cooling cycle connected to the engine is stopped, and it causes a lack of a heat source for cooling, and thus, comfort inside the cars is deteriorated.

In order to solve the above problem, there have been many studies on an air conditioner which has a cold storage function inside the air conditioner or has a battery separately mounted so as to operate the air conditioner by the battery when the engine is stopped for a long time.

FIG. 1 is a schematic diagram of a conventional air conditioner for a vehicle.

As shown in FIG. 1, the conventional air conditioner for the vehicle includes an air-conditioning case 1, an air blower 2a, an evaporator 3a and a heater core 4, a temperature-adjusting door 5, and a storage tank 6.

The air-conditioning case 1 includes: an indoor and outdoor air converting door 1a mounted at an inlet for allowing an inflow of the indoor air and the outdoor air; and vents 1e, 1f and 1g mounted at an outlet and adjusted in the degree of opening by doors 1b, 1c and 1d. The air blower 2a is mounted at the inlet of the air-conditioning case 1, and the evaporator 3a and the heater core 4 are mounted in an inside flow channel of the air-conditioning case 1 in order.

The temperature-adjusting door 5 adjusts the degree of opening of a cold air passageway P1 and a warm air passageway P2 of the air-conditioning case 1, and the storage tank 6 is arranged at the downstream side of the evaporator 3a in order to accumulate cold air passing through the evaporator 3a.

In the conventional air conditioner for the vehicle having the above structure, when a compressor (not shown) interlocked with the engine is operated, a refrigerant cycle including the evaporator 3a is also operated and the indoor air and the outdoor air introduced through the indoor and outdoor air converting door 1a are heat-exchanged in the evaporator 3a and discharged to the vents 1e, 1f and 1g, and during the above process, cold air heat-exchanged in the evaporator 3a is accumulated in the storage tank 6.

In the above state, in the case of the hybrid cars which stop operation of the engine for a short period of time like when the cars stop by waiting for signal or like when the cars are stopped due to traffic jam, the operation of the refrigerant cycle is stopped by the stop of the engine, and thus, cold air accumulated in the storage tank 6 is discharged so as to cool the inside of the car.

The conventional air conditioner for the vehicle needs the storage tank 6 of a large capacity in order to sufficiently carry out the cold storage function. However, if capacity of the storage tank 6 is increased, the air conditioner occupies a large installation space and the entire load and volume of the air conditioner are also increased.

SUMMARY OF THE INVENTION

Accordingly, the present invention has been made to solve the above-mentioned problems occurring in the prior arts, and it is an object of the present invention to provide an air conditioner for a vehicle, which includes an evaporator and a storage tank getting in surface contact with each other so as to maximize a cold storage effect and to effectively enhance a heat exchange performance without increasing capacity of the storage tank.

It is another object of the present invention to provide an air conditioner for a vehicle, which additionally has heat-exchanging means mounted inside the storage tank so as to enhance the heat exchange performance of a heat carrier more.

To accomplish the above object, according to the present invention, there is provided an air conditioner for a vehicle including: an air-conditioning case; an evaporator and a heater core mounted inside the air-conditioning case along an air flow direction in order; a flow rate control valve mounted between inlet and outlet pipes of the heater core and a cooling water pipe of an engine for controlling a flow rate of cooling water circulating from the engine to the heater core; a circulation pump for circulating the cooling water contained inside the heater core, wherein the cooling water contained in the heater core is used as a heat carrier for cold storage or heat storage; and a storage tank on which the evaporator is mounted, the storage tank having a surface contact part for allowing the evaporator to be in surface contact with the storage tank so as to carry out heat exchange of the heat carrier.

According to the exemplary embodiments of the present invention, because the evaporator is mounted on the upper portion of the storage tank, the air conditioner can double a cold storage effect by directly transferring cold air of the evaporator to the storage tank in a cooling mode, and maximize the cold storage effect since condensate water generated from the surface of the evaporator additionally cools the surface of the storage tank.

Moreover, because the storage tank includes the partition part disposed therein, the air conditioner can effectively enhance the heat exchange performance without increasing the volume of the storage tank.

Furthermore, the air conditioner for the vehicle according to the exemplary embodiments of the present invention can control flow rate and flow speed of the heat carrier through the partition part formed inclinedly, thereby enhancing the heat exchange performance.

Additionally, the air conditioner for the vehicle according to the exemplary embodiments of the present invention can maximize the heat exchange performance of the storage tank through the baffle having a specific form.

In addition, because the refrigerant pipe of the outlet side of the evaporator is inserted into the storage tank to pass through the storage tank, the cold refrigerant flowing in the refrigerant pipe of the outlet side of the evaporator exchanges heat with the cooling water (heat carrier) contained in the storage tank, such that the cooling water of the storage tank is more rapidly cooled so as to enhance the cold storage efficiency.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 2:
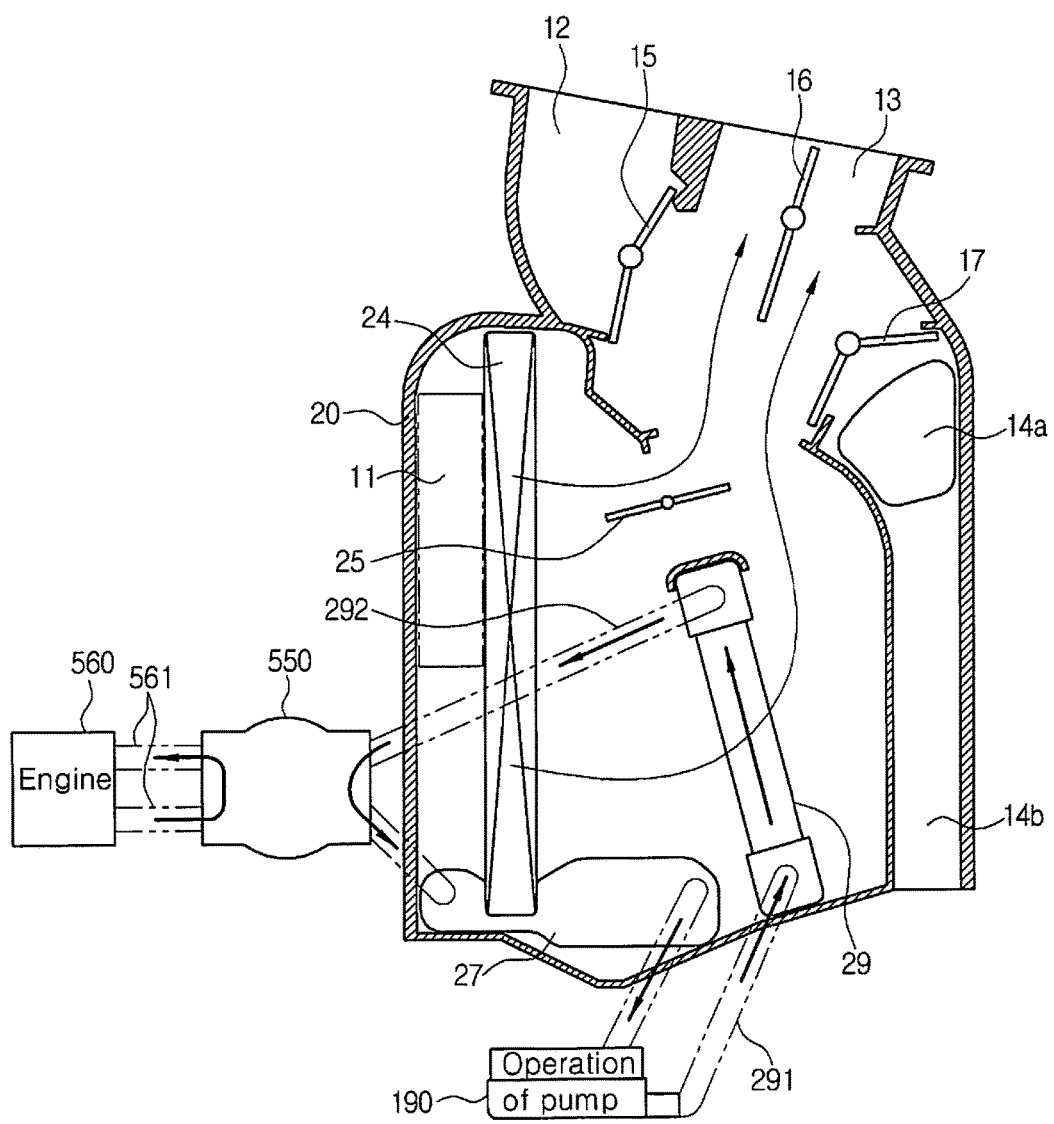
FIG. 2 is a schematic diagram of an air conditioner for a vehicle according to a first preferred embodiment of the present invention.
Figure 3:
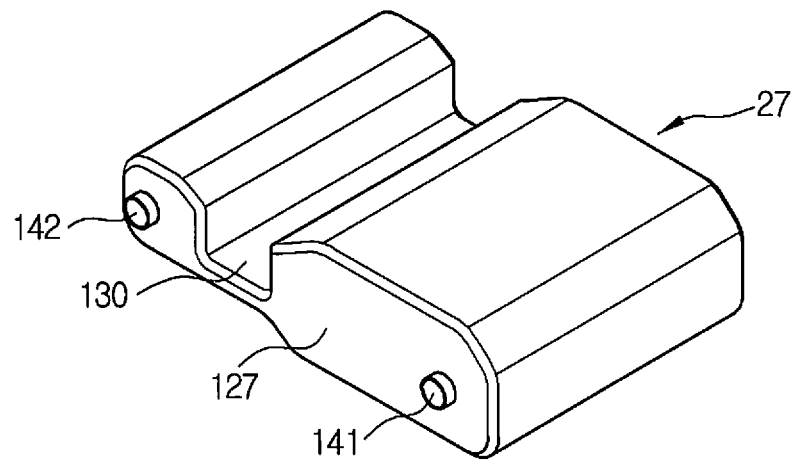
FIG. 3 is a perspective view of a storage tank of the air conditioner for the vehicle according to the first preferred embodiment of the present invention.
Figure 4:
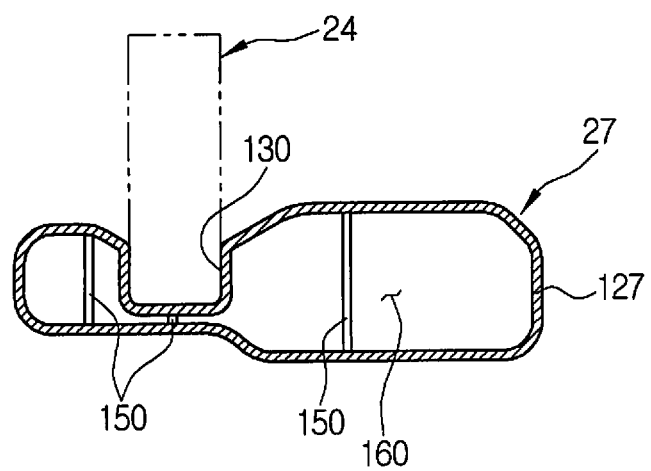
FIG. 4 is a side sectional view of the storage tank of the air conditioner for the vehicle according to the first preferred embodiment of the present invention.
Figure 5:
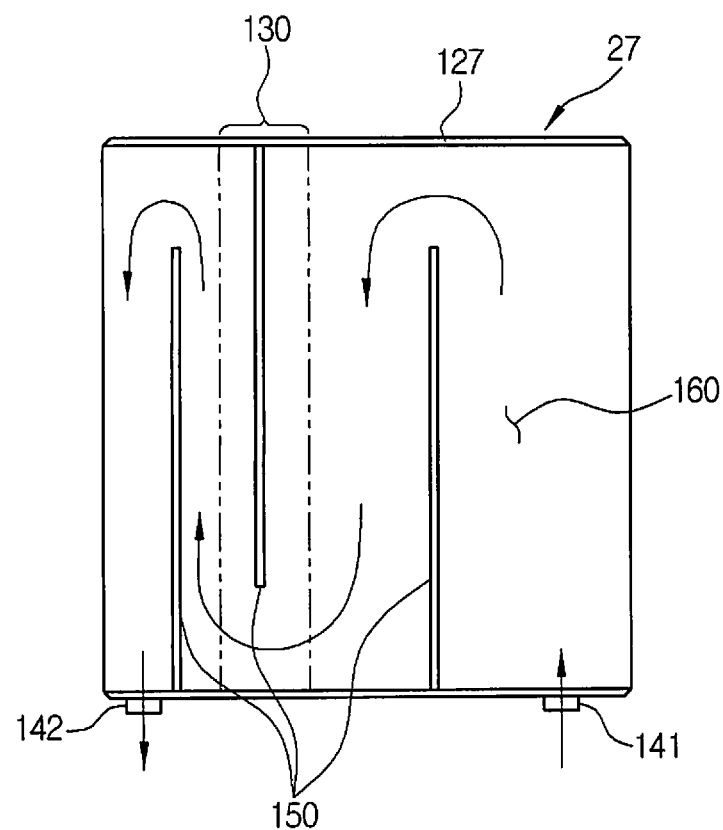
FIG. 5 is a plan view showing the inside of the storage tank of the air conditioner for the vehicle according to the first preferred embodiment of the present invention.

FIG. 2 is a schematic diagram of an air conditioner for a vehicle according to a first preferred embodiment of the present invention, FIG. 3 is a perspective view of a storage tank of the air conditioner for the vehicle according to the first preferred embodiment of the present invention, FIG. 4 is a side sectional view of the storage tank of the air conditioner for the vehicle according to the first preferred embodiment of the present invention, and FIG. 5 is a plan view showing the inside of the storage tank of the air conditioner for the vehicle according to the first preferred embodiment of the present invention.

As shown in FIGS. 2 to 5, the air conditioner for the vehicle according to the first preferred embodiment of the present invention includes an air-conditioning case 20, an evaporator 24 and a heater core 29, a flow rate control valve 550, a circulation pump 190, and a storage tank 27.

The air-conditioning case 20 includes an air inflow port 11 formed at an inlet, a plurality of air outflow ports formed at an outlet, and an air passageway formed therein for communicating the air inflow port 11 with the air outflow ports. In this instance, air outflow ports respectively have a defrost vent 12 for discharging air toward a front window of the vehicle, a face vent 13 for discharging air toward a front seat passenger's face, and floor vents 14a and 14b for discharging air toward the passenger's feet. Moreover, the defrost vent 12, the face vent 13 and the floor vents 14a and 14b are respectively opened and closed by mode doors 15, 16 and 17.

The evaporator 24 and the heater core 29 are mounted in an inside flow channel of the air-conditioning case 20 in order.

In a cooling mode, when a compressor (not shown) is operated, refrigerant circulates the compressor, a condenser (not shown), an expansion valve (not shown) and the evaporator 24, and during the above process, air passing through the evaporator 24 is cooled by being heat-exchanged with cold refrigerant located inside the evaporator 24, and then, is discharged to the inside of the vehicle through the air outflow ports of the air-conditioning case 20, such that cooling is achieved.

Furthermore, the heater core 29 includes a pair of tanks (not shown), a plurality of tubes (not shown) for connecting the tanks, radiation fins (not shown) interposed between the tubes, and inlet and outlet pipes 291 and 292 respectively connected to the tanks. In this instance, the inlet and outlet pipes 291 and 292 of the heater core 29 are extendably mounted toward an engine 560 of the vehicle, and are communicatably connected with cooling water pipes 561 of the engine 560. Finally, hot cooling water heated from the engine 560 at the time of a start of the engine 560 circulates the heater core 29, and then, is returned to the engine 560. During the above process, air passing through the heater core 29 is heated by being heat-exchanged with the hot cooling water of the heater core 29, and then, is discharged to the inside of the vehicle through the air outflow ports of the air-conditioning case 20, such that heating is achieved.

The flow rate control valve 550 is mounted between the inlet and outlet pipes 291 and 292 of the heater core 29 and the cooling water pipes 561 of the engine 560 in order to control a flow rate of the cooling water circulating from the engine 560 to the heater core 29. In this instance, a temperature-adjusting door is mounted in front of the heater core 29 in order to control a mixed amount of cold air passing through the evaporator 24 and warm air passing through the heater core 29, so that temperature of air discharged to the inside of the vehicle can be adjusted. The flow rate control valve 550 may be in the form of a four way directional valve which can selectively bypass or communicate the cooling water circulating from the engine 560 to the heater core 29. Detailed description of a structure of the flow rate control valve 550 will be omitted, and the operation of the flow rate control valve 550 will be described in detail later.

The circulation pump 190 serves to circulate the cooling water of the storage tank 27 to the heater core 29 when the flow rate control valve 550 blocks the cooling water supplied to the heater core 29.

The storage tank 27 is mounted on a cooling water circulation line circulating the heater core 29 in order to carry out cold storage or heat storage. The evaporator 24 is mounted on the upper portion of the storage tank 27. Additionally, the storage tank 27 has a surface contact part 130 which is in surface contact with the evaporator 24 so as to carry out heat-exchange with a heat carrier.

That is, the storage tank 27 carries out cold storage or heat storage to the cooling water of the storage tank 27 in the cooling mode or in the heating mode, and circulates the cooling water cold-stored or heat-stored inside the storage tank 27 so as to prevent temperature of the discharged air of the air-conditioning case 20 from being suddenly changed when the engine is in a stop state.

Moreover, because the evaporator 24 is mounted on the upper portion of the storage tank 27, in the cooling mode, cold air of the evaporator 24 is directly transferred to the storage tank 27 so as to double the cold storage effect, and condensate water generated from the surface of the evaporator 24 additionally cools the surface of the storage tank 27 so as to maximize the cold storage effect.

Furthermore, the air-conditioning case 20 includes a bypass passageway 25a formed above the upper portion of the heater core 29 inside the air-conditioning case 20 for bypassing some of the air passing through the evaporator 24, and a bypass door 25 for controlling the degree of opening is mounted in the bypass passageway 25a. The bypass door 25 selectively opens and closes the bypass passageway 25a according to conditions of the vehicle. Finally, in the initial cooling mode, when the bypass passageway 25a is opened by the bypass door 25, some of the air cooled in the evaporator 24 passes through the heater core 29, but some of the cooled air bypasses the heater core 29 through the bypass passageway 25a so as to enhance a rapid action for the maximum cooling. The bypass door 25 opens the bypass passageway 25a just in the cooling mode during the operation of the engine 560, but closes the bypass passageway 25a in the heating mode and when the engine 560 is stopped in the cooling and heating modes during the operation of the engine 560.

However, besides the above-mentioned structure, the air conditioner for the vehicle according to the preferred embodiment of the present invention may have the form of the air conditioner installed in electric vehicles or one of other forms.

Now, in relation with a contact structure between the storage tank 27 and the evaporator 24 and an internal structure of the storage tank 27, the structure of the air conditioner for the vehicle according to the preferred embodiment of the present invention will be described in more detail.

That is, the storage tank 27 includes a surface contact part 130 and a plurality of partition parts 150. The storage tank 27 may have just one partition part 150, but, in this preferred embodiment, a plurality of the partition parts 150 are disposed in the storage tank 27.

The surface contact part 130 is in surface contact with the evaporator 24 in order to carry out heat exchange of the heat carrier (cooling water, hereinafter called 'heat carrier').

The partition parts 150 are formed inside the storage tank 27 to form a flow channel of the heat carrier. The partition parts 150 functions to enhance the heat-exchange performance of the heat carrier.

In other words, the partition parts 150 are extended from the bottom surface to the top surface inside the storage tank 27, are interdigitated at both sides of the storage tank 27 to form a zigzag flow channel of the heat carrier. Therefore, the heat carrier flowing inside the storage tank 27 is increased in channel flow resistance during the heat exchange with the evaporator 24 through the surface contact part 130 but is reduced in flow rate, and thus, a congestion period of time of the heat carrier becomes longer near the surface contact part 130.

As described above, because the partition parts 150 are formed inside the storage tank 27 at the same time with the surface contact between the evaporator 24 and the storage tank 27, the heat exchange performance of the storage tank 27.

In this instance, the storage tank 27 has an approximately cuboid form in which a space part 160 is formed, and the surface contact part 130 is formed by the upper portion of the storage tank 27 dented inwardly. The storage tank 27 includes: an inlet 141 for introducing the heat carrier into the storage tank 27; and an outlet 142 for discharging the heat carrier to the outside of the storage tank 27.

The evaporator 24 is inserted into the dented portion of the surface contact part 130, and hence, is in a direct surface contact with the sides and the bottom surface of the dented portion of the surface contact part 130. Therefore, the heat carrier inserted into the storage tank 27 through the inlet 141 flows along the flow channel of the zigzag form formed by the partition parts 150, and exchanges heat with the evaporator 24 through the sides and the bottom surface of the dented portion of the surface contact part 130.

Through the above-mentioned structure, the storage tank 27 with a relatively small volume can effectively exchange heat with the evaporator 24, and can reduce manufacturing costs because it does not need additional ducts or pipes.

Moreover, at least one of the partition parts 150 is arranged directly beneath the surface contact part 130.

By the partition part 150 arranged directly beneath the surface contact part 130, at least one curved section where the heat carrier flows is formed near the surface contact part 130 which is in contact with the evaporator 24, and such a curved section increases the flow channel resistance of the heat carrier so as to effectively promote the heat exchange of the storage tank 27.

Figure 6:
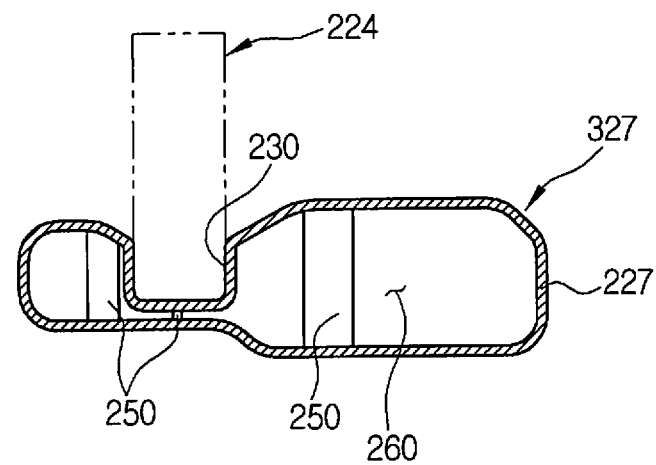
FIG. 6 is a side sectional view of a storage tank according to a second preferred embodiment of the present invention.
Figure 7:
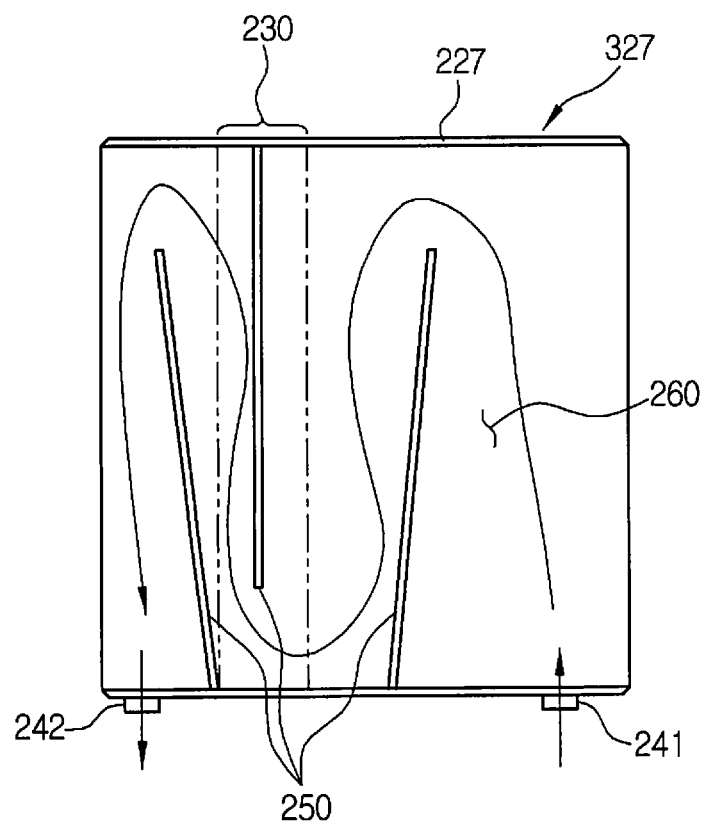
FIG. 7 is a plan view showing the inside of the storage tank according to the second preferred embodiment of the present invention.

FIG. 6 is a side sectional view of a storage tank according to a second preferred embodiment of the present invention, and FIG. 7 is a plan view showing the inside of the storage tank according to the second preferred embodiment of the present invention.

Referring to FIGS. 6 and 7, a storage tank 327 includes a surface contact part 230 and a plurality of partition parts 250. The storage tank 327 may have just one partition part 250, but, in this preferred embodiment, a plurality of the partition parts 250 are disposed in the storage tank 327.

The surface contact part 230 is in surface contact with the evaporator 224 in order to carry out heat exchange of the heat carrier, such as water.

The partition parts 250 are formed inside the storage tank 327 to form a flow channel of the heat carrier. The partition parts 250 functions to enhance the heat-exchange performance of the heat carrier.

In other words, the partition parts 250 are extended from the bottom surface to the top surface inside the storage tank 327, are interdigitated at both sides of the storage tank 327 to form a zigzag flow channel of the heat carrier. Therefore, the heat carrier flowing inside the storage tank 327 is increased in channel flow resistance during the heat exchange with the evaporator 224 through the surface contact part 230 but is reduced in flow rate, and thus, a congestion period of time of the heat carrier becomes longer near the surface contact part 230.

As described above, because the partition parts 250 are formed inside the storage tank 327 at the same time with the surface contact between the evaporator 224 and the storage tank 327, the heat exchange performance of the storage tank 327.

In this instance, the storage tank 327 has an approximately cuboid form in which a space part 260 is formed, and the surface contact part 230 is formed by the upper portion of the storage tank 327 dented inwardly. The storage tank 327 includes: an inlet 241 for introducing the heat carrier into the storage tank 327; and an outlet 242 for discharging the heat carrier to the outside of the storage tank 327.

The evaporator 224 is inserted into the dented portion of the surface contact part 330, and hence, is in a direct surface contact with the sides and the bottom surface of the dented portion of the surface contact part 230. Therefore, the heat carrier inserted into the storage tank 327 through the inlet 241 flows along the flow channel of the zigzag form formed by the partition parts 250, and exchanges heat with the evaporator 324 through the sides and the bottom surface of the dented portion of the surface contact part 230.

In this instance, the partition parts 250 are formed inclinedly in a direction of the flow channel of the heat carrier (a flow direction of the heat carrier). In other words, the partition parts 250 arranged at both sides of the surface contact part 230 are respectively inclined toward the partition parts 250 arranged directly beneath the surface contact part 230, such that a cross sectional area of the flow channel of the heat carrier becomes narrower near the surface contact part 230.

As described above, as the cross sectional area of the flow channel of the heat carrier becomes narrower, the heat carrier flowing in the narrower flow channel section is increased in flow channel resistance and is reduced in flow rate inside the storage tank 327, such that the heat exchange performance of the storage tank 327 is maximized.

Figure 8:
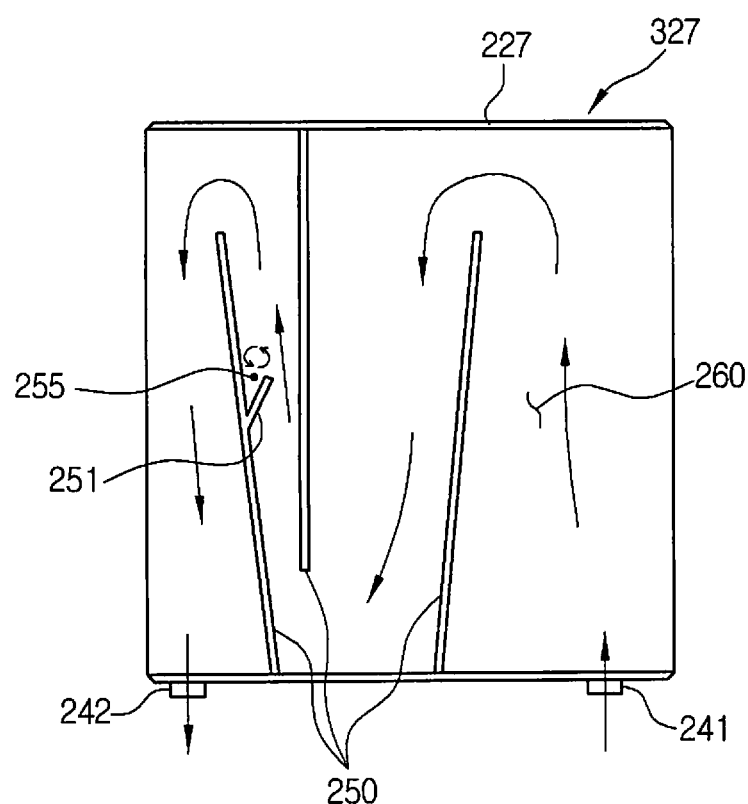
FIG. 8 is a plan view showing the inside of a storage tank according to a modification of FIG. 7.

Moreover, FIG. 8 is a plan view showing the inside of a storage tank according to a modification of FIG. 7.

As shown in FIG. 8, the storage tank 327 further includes at least one baffle 251.

The baffle 251 protrudes from the partition part 250, and it is preferable that the baffle 251 be arranged near the surface contact part 230. The baffle 251 increases the flow channel resistance of the heat carrier more so as to reduce the flow rate of the heat carrier inside the storage tank 327 more effectively, such that the heat exchange performance of the storage tank 327 is maximized more.

In this instance, the baffle 251 extends inclinedly along the flow direction of the heat carrier from the side wall of the partition part 250. Therefore, an eddy is generated at a rear space 255 formed between the partition part 250 and the baffle 251 when the heat carrier flows, and the eddy helps enhancement of the heat exchange performance of the storage tank 327 in the vicinity of the surface contact part 230.

Figure 9:
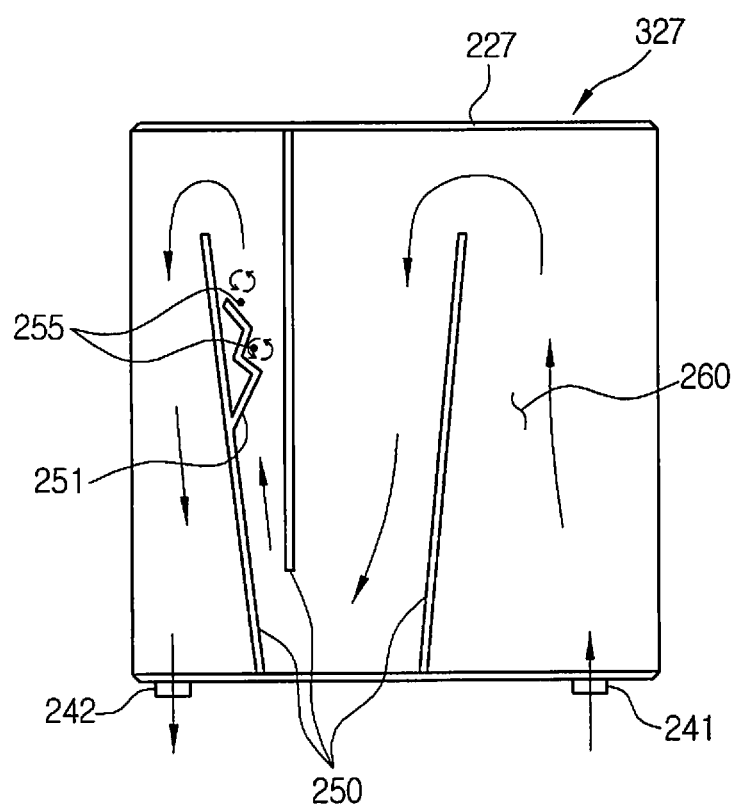
FIG. 9 is a plan view showing the inside of a storage tank according to another modification of FIG. 7.

In the meantime, FIG. 9 is a plan view showing the inside of a storage tank according to another modification of FIG. 7.

As shown in FIG. 9, the baffle 251 may be formed in a zigzag.

The zigzag-formed baffle 251 helps reduction of the flow rate of the heat carrier, and enhances the heat exchange performance of the storage tank 327 because eddy is generated at concave portions 255 formed between valleys of the baffle 251 while the heat carrier flows.

Figure 10:
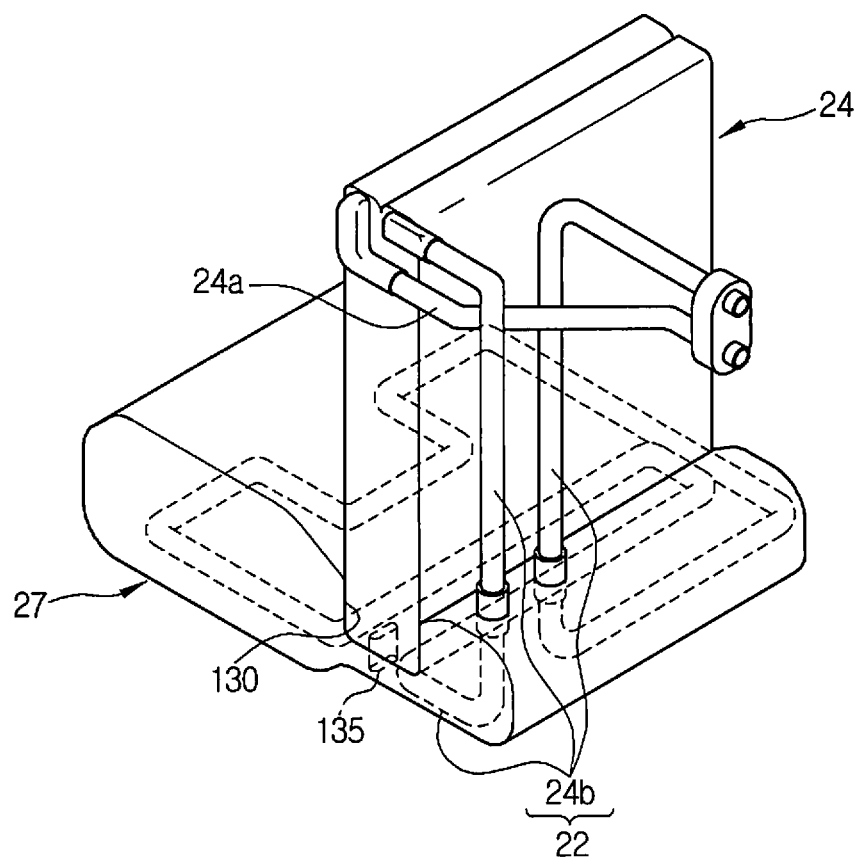
FIG. 10 is a perspective view showing a state where heat-exchanging means is mounted inside the storage tank according to the present invention.
Figure 11:
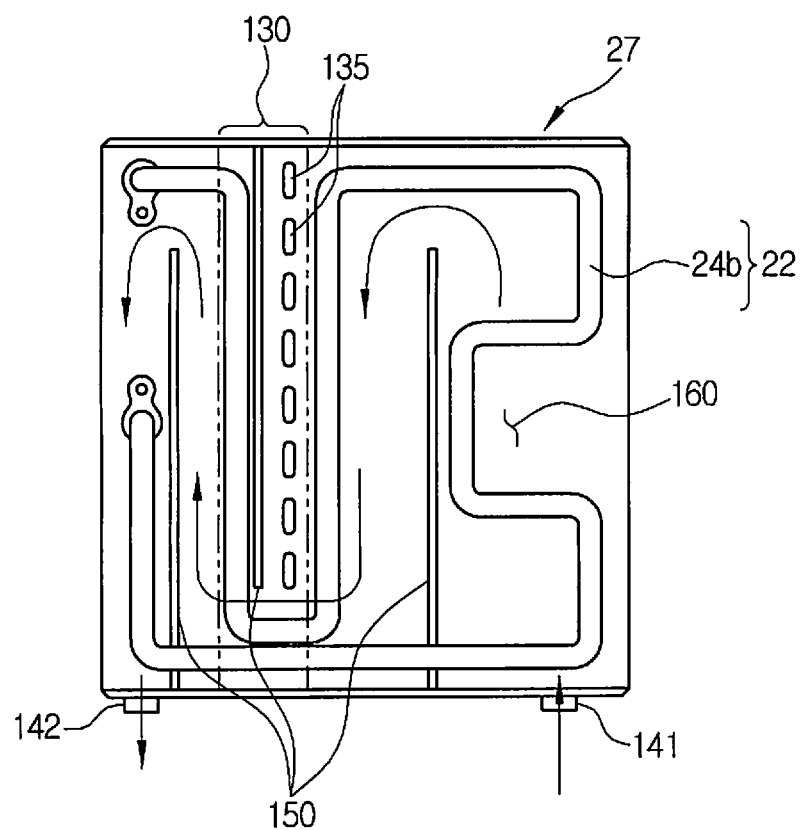
FIG. 11 is a plan view showing the inside of the storage tank of FIG. 10.

FIG. 10 is a perspective view showing a state where heat-exchanging means is mounted inside the storage tank according to the present invention, and FIG. 11 is a plan view showing the inside of the storage tank of FIG. 10.

FIGS. 10 and 11 illustrate an example that heat-exchanging means 22 is applied to the inside of the storage tank 27 according to the preferred embodiment of the present invention, and it may be applied not only to this preferred embodiment but also all preferred embodiments of the present invention.

As shown in FIGS. 10 and 11, the heat-exchanging means 22 is mounted inside the storage tank 27 in order to exchange heat between refrigerant circulating the evaporator 24 and the heat carrier (cooling water) stored in the storage tank 27.

The heat-exchanging means 22 is constructed in such a manner that a refrigerant pipe connected to the evaporator 24, out of refrigerant pipes which connect the compressor, the condenser, the expansion valve and the evaporator 24 with one another, is mounted to pass through the storage tank 27.

Here, the refrigerant pipe connected to the evaporator 24 includes: an inlet pipe 24a for introducing refrigerant into the evaporator 24; and an outlet pipe 24b for discharging refrigerant to the outside.

In this instance, it is preferable that the refrigerant pipe passing through the inside of the storage tank 27 be the outlet pipe 24b of the evaporator 24.

That is, in the cooling mode, the refrigerant flowing in the outlet pipe 24b of the evaporator 24 is a cold refrigerant of low temperature and low pressure.

Therefore, because a partial section of the outlet pipe 24b of the evaporator 24 is inserted into the storage tank 27 to pass through the storage tank 27, the heat carrier of the storage tank 24 exchanges heat with the cold refrigerant flowing in the outlet pipe 24b of the evaporator 24, such that the cooling water of the storage tank 24 is more rapidly cooled so as to enhance the cold storage efficiency.

Moreover, the outlet pipe 24b of the evaporator 24, which is the refrigerant pipe passing through the storage tank 27 is formed along the flow channel of the heat carrier inside the storage tank 27. Therefore, the flow channel resistance of the heat carrier is increased more by the outlet pipe 24b formed along the flow channel of the heat carrier inside the storage tank 27, and thus, the heat carrier can flow in a limited space of the storage tank 27 as long as possible and a heat exchange period of time between the outlet pipe 24b and the heat carrier becomes longer, such that the heat exchange performance is enhanced.

Meanwhile, the partial section of the outlet pipe 24b of the evaporator 24 inserted into the storage tank 27 is bent in a zigzag form so as to increase a heat exchange area with the heat carrier and to increase the flow channel resistance of the heat carrier more, such that the flow rate is reduced.

Figure 1:
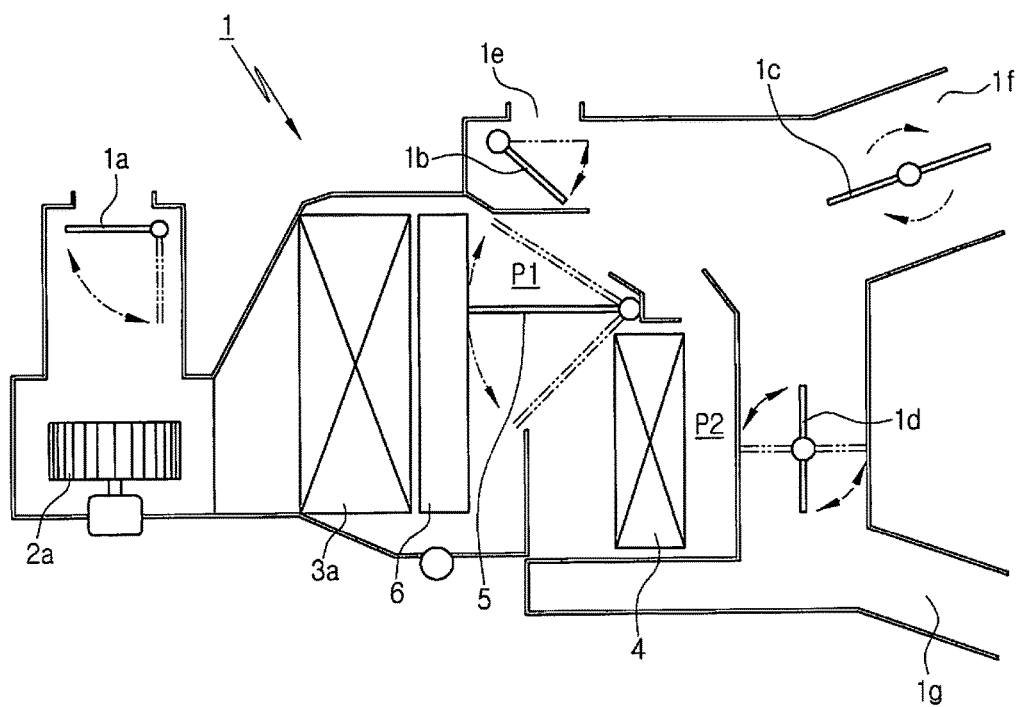
FIG. 1 is a schematic diagram of a conventional air conditioner for a vehicle.

Additionally, as shown in FIGS. 10 and 1, a drain hole 135 is formed in the surface contact part 130 in order to smoothly drain condensate water generated in the evaporator 24.

The drain hole 135 is formed to vertically penetrate the storage tank 27 from the bottom surface of the surface contact part 130. In this instance, the drain hole 135 is partitioned from the inside of the storage tank 27.

Therefore, the condensate water generated in the evaporator 24 and dropping down into the surface contact part 13 can be drained smoothly through the drain hole 135.

Figure 12:
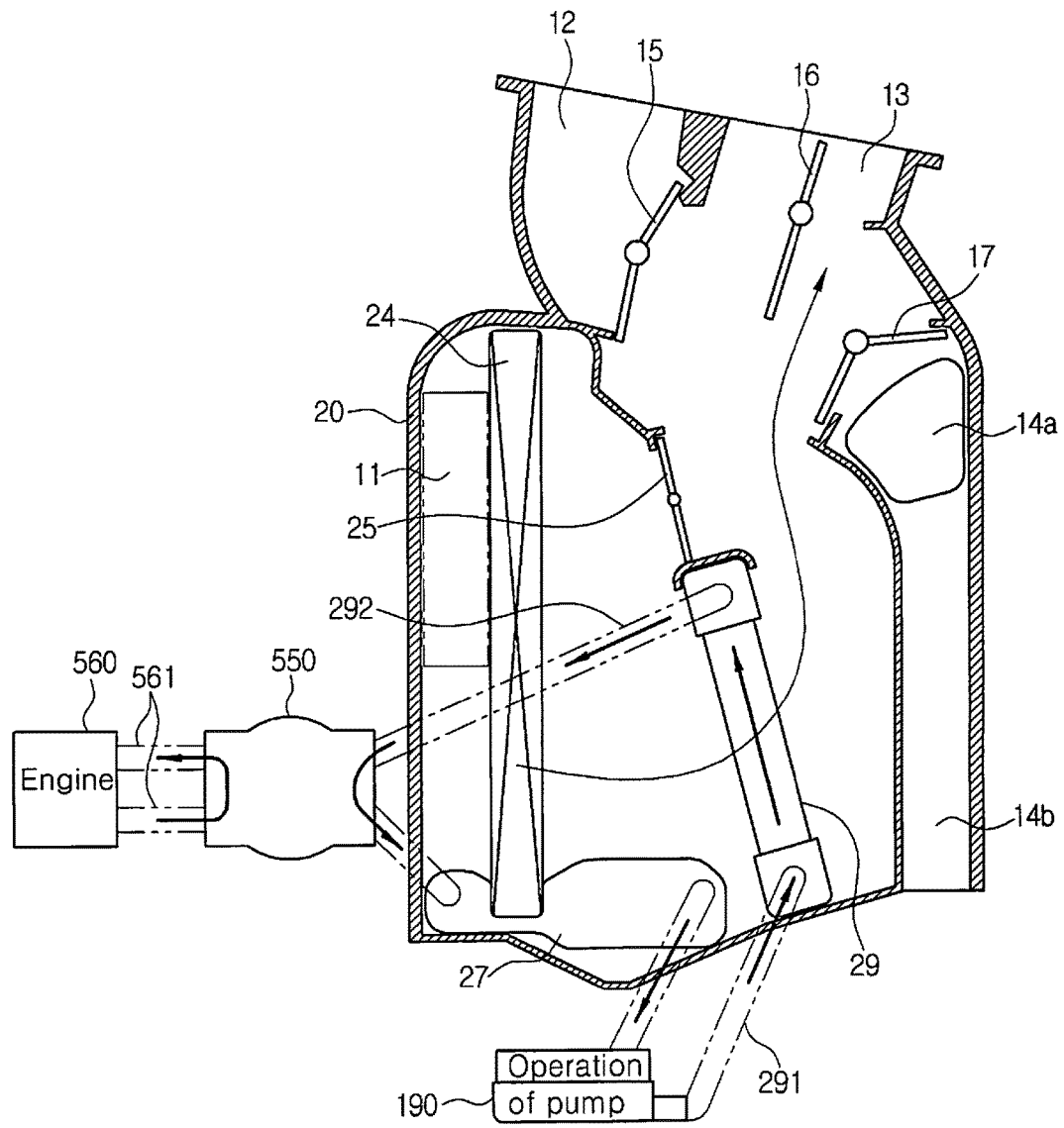
FIG. 12 is a sectional view showing a state where an engine is stopped during a cooling mode in the air conditioner for the vehicle according to the second preferred embodiment of the present invention.
Figure 13:
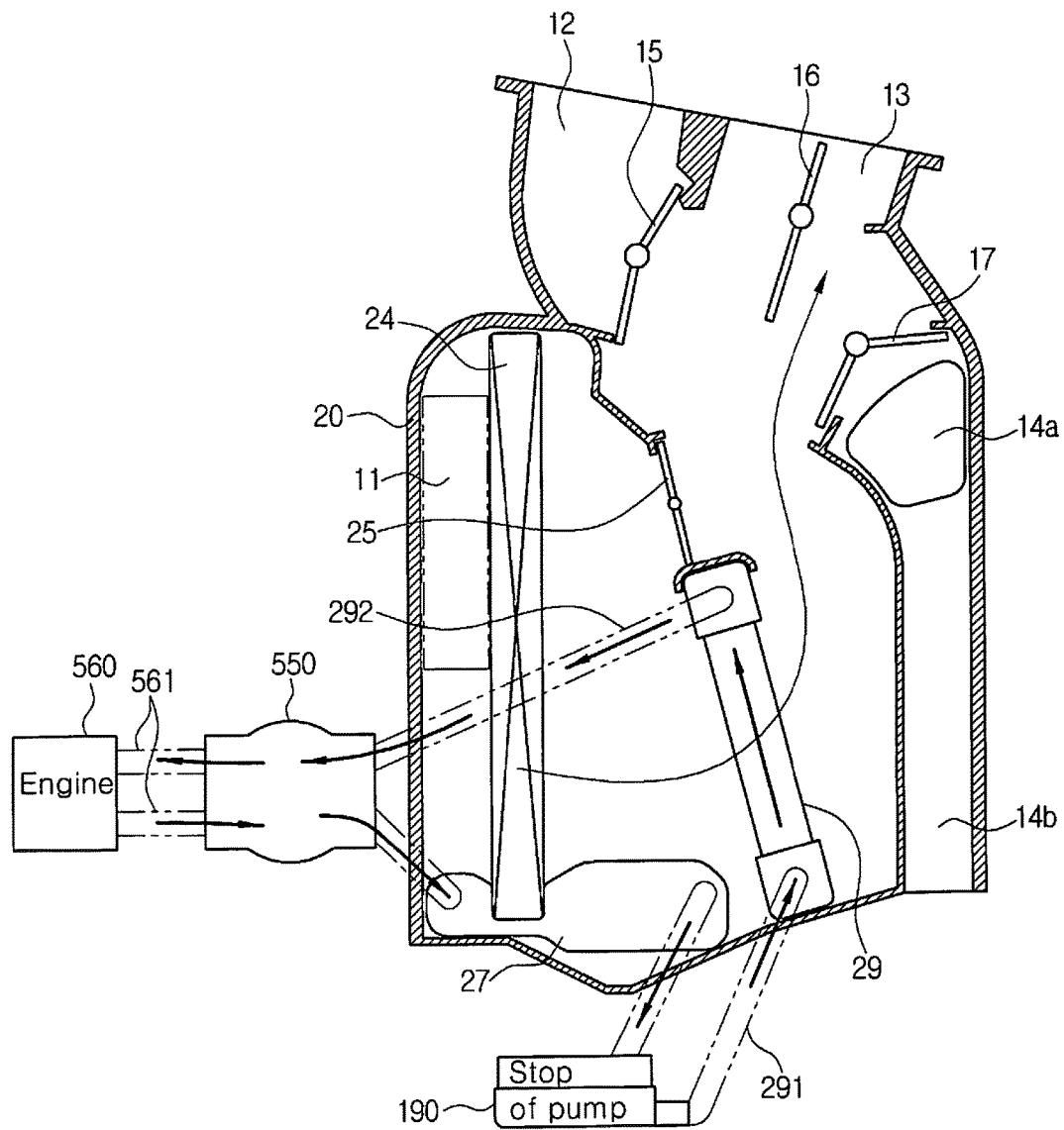
FIG. 13 is a sectional view showing a heating mode in the air conditioner for the vehicle according to the second preferred embodiment of the present invention.
Figure 14:
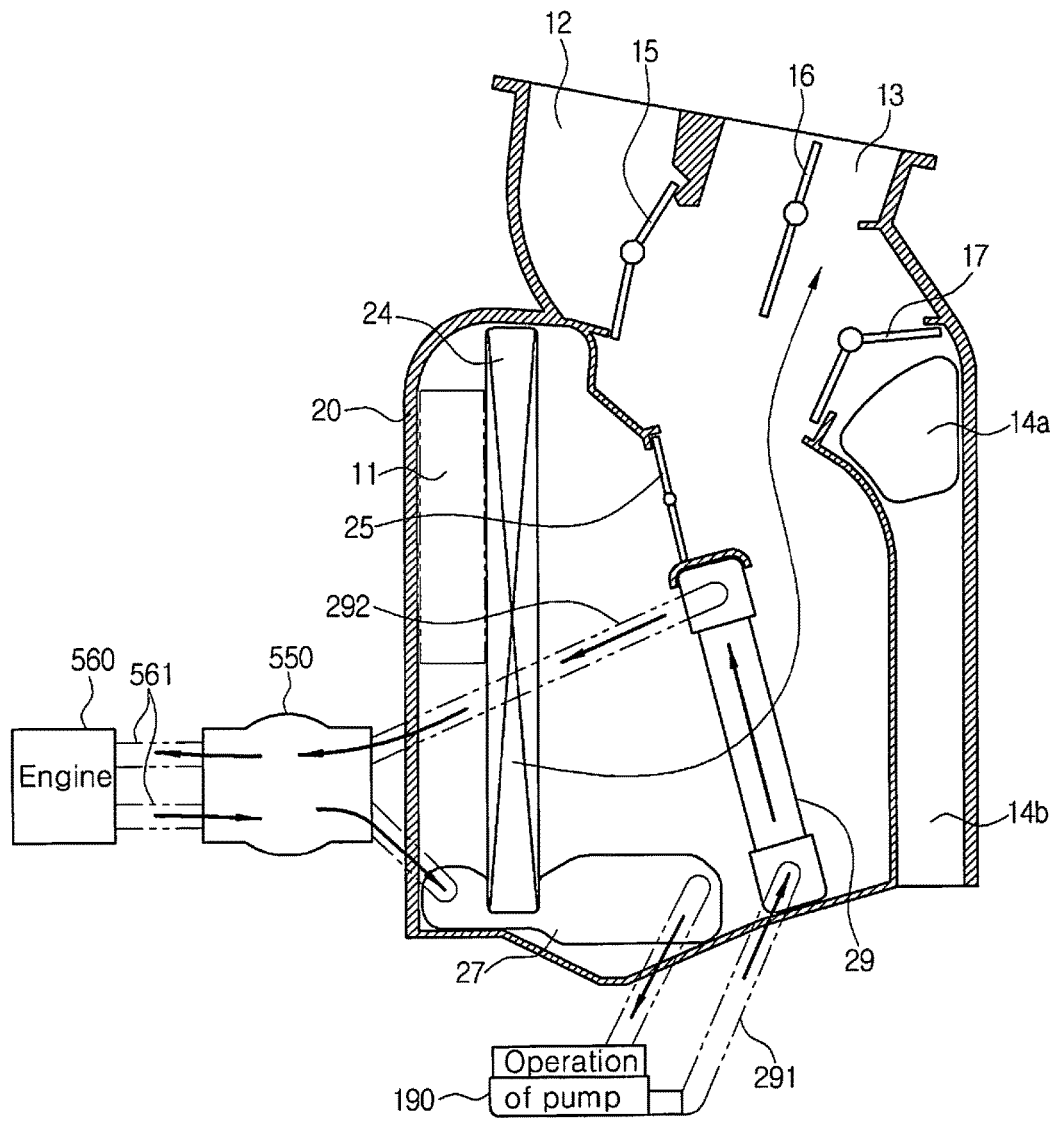
FIG. 14 is a sectional view showing a state where the engine is stopped during the heating mode in the air conditioner for the vehicle according to the second preferred embodiment of the present invention.

FIG. 12 is a sectional view showing a state where an engine is stopped during a cooling mode in the air conditioner for the vehicle according to the second preferred embodiment of the present invention, FIG. 13 is a sectional view showing a heating mode in the air conditioner for the vehicle according to the second preferred embodiment of the present invention, and FIG. 14 is a sectional view showing a state where the engine is stopped during the heating mode in the air conditioner for the vehicle according to the second preferred embodiment of the present invention.

Referring to FIGS. 2 and 12 to 14, the operation of the air conditioner for the vehicle according to the preferred embodiments of the present invention will be described.

A. Cooling Mode (See FIG. 2)

In the cooling mode, when the flow rate control valve 550 perfectly blocks cooling water supplied from the engine 560 to the heater core 29, the cooling water supplied from the engine 560 makes a U-turn to return to the engine 560. Moreover, the bypass door 25 opens the bypass passageway 25a, and the circulation pump 190 is operated.

Therefore, the air introduced through the air inflow port 11 of the air-conditioning case 20 is cooled while passing through the evaporator 24, and some of the cold air bypasses the heater core 29 through the bypass passageway 25a, and some of the cold air passes the heater core 29 and is discharge to the inside of the vehicle through the air outflow port opened by the mode door according to air-conditioning modes, such that cooling is achieved.

In the above process, the cold air cooled while passing through the evaporator 24 cools the cooling water of the heater core 29 while passing through the heater core 29, and thus, the cooling water is cooled. While the cold cooling water in the heater core 29 circulates to the storage tank 27, the storage tank 27 carries out cold storage.

In this instance, because the evaporator 24 mounted on the upper portion of the storage tank 27 gets in surface contact with the storage tank 27, the cold air of the evaporator 27 is directly transferred to the cooling water of the storage tank 27 so as to double the cold storage effect, and the condensate water generated from the surface of the evaporator 27 additionally cools the surface of the storage tank 27 so as to maximize the cold storage effect.

B. At the Time of Engine Stop in Cooling Mode (See FIG. 12)

When the engine 560 of the vehicle is stopped by waiting for signal or by a stop signal while the vehicle travels in the cooling mode, the compressor is stopped and the air conditioner is turned off. In this instance, because temperature of the evaporator 24 rises, temperature of the air passing through the evaporator 24 may rapidly rise. In order to prevent such a rapid rise of temperature, the bypass door 25 closes the bypass passageway 25a so that the entire air passing through the evaporator 24 passes the heater core 29, and the circulation pump 190 operates continuously so as to circulate the cold cooling water of the storage tank 27 to the heater core 29.

Therefore, because the elevated temperature of the air while passing through the evaporator 24 drops by the cold cooling water of the heater core 29, the air conditioner according to the preferred embodiment of the present invention can prevent a rapid rise of temperature of the air discharged to the inside of the vehicle, and thus, can remove passengers' displeasure.

C. Heating Mode (See FIG. 13)

In the heating mode, the flow rate control valve 550 circulates hot cooling water heated from the engine 560 to the heater core 29 and returns the cooling water to the engine 560, and the bypass door 25 closes the bypass passageway 25a. Moreover, in the heating mode while the engine 560 is operated, the circulation pump 190 is in a stopped condition, and the cooling water circulates the heat core 29 by a water pump (not shown) of the engine 560.

Therefore, the air introduced through the air inflow port 11 of the air-conditioning case 20 passes through the evaporator 24, and the air passing through the evaporator 24 is heated through heat exchange with the heater core 29 while passing through the heater core 29, and then, is discharged to the inside of the vehicle through the air outflow portion opened by the mode door according to the air-conditioning modes, such that heating is achieved. In the above process, because the hot cooling water heated and supplied from the engine 560 is returned to the engine 560 after circulating not only to the heater core 29 but also to the storage tank 27, the cooling water of the storage tank 27 is heated, such that the storage tank 27 can carry out heat storage.

D. At the Time of Engine Stop in Heating Mode (See FIG. 14)

When the engine 560 of the vehicle is stopped by waiting for signal or by a stop signal while the vehicle travels in the heating mode, supply of cooling water from the engine 560 is also stopped. In this instance, because temperature of the heater core 29 drops, temperature of the air passing through the heater core 29 may rapidly drop. In order to prevent such a rapid drop of temperature, the circulation pump 190 is operated, so that the cooling water of a hot state remaining in the engine 560 even after the stop of the engine 560 and the hot cooling water stored in the storage tank 29 are circulated to the heater core 29.

Therefore, even though the engine 560 is stopped during the heating mode, because the hot cooling water stored in the engine 560 and the hot cooling water stored in the storage tank 27 circulate the heater core 29, the air passing through the heater core 29 is discharged to the inside of the vehicle without any big change in temperature for a predetermined period of time so as to carry out heating, such that the air conditioner can prevent a rapid drop of temperature of the air discharged to the inside of the vehicle and remove the passengers' displeasure.

As described above, while the present invention has been particularly shown and described with reference to the example embodiments thereof, it will be understood by those of ordinary skill in the art that the above exemplary embodiments of the present invention are all exemplified and various changes, modifications and equivalents may be made therein without changing the essential characteristics and scope of the present invention. Therefore, it would be understood that the technical and protective scope of the present invention shall be defined by the technical idea and scope of the following claims.

What is claimed is:

1. An air conditioner for a vehicle, wherein the air conditioner is configured to operate in a cooling mode and a heating mode, the air conditioner comprising:
   an air-conditioning case;
   an evaporator and a heater core mounted inside the air-conditioning case along an air flow direction in order;
   a flow rate control valve mounted between inlet and outlet pipes of the heater core and a cooling water pipe of an engine, wherein the flow rate control valve is configured to control a flow rate of cooling water circulating from the engine to the heater core, wherein the cooling water is a heat carrier for cold storage or heat storage;
   a circulation pump configured to circulate the cooling water contained inside the heater core; and
   a storage tank comprising a surface contact part throughout which the evaporator is in surface contact with the storage tank,
   wherein the surface contact part is an inwardly dented cavity comprising at least two sides perpendicular to a bottom surface, is formed in the external surface of the storage tank on the upper portion of the storage tank into which the evaporator is inserted, and is configured to carry out heat exchange of the heat carrier, wherein the storage tank is configured to exchange heat with the evaporator through the at least two sides and the bottom surface of the inwardly dented cavity, wherein the external surface of the storage tank is configured to be cooled by condensate water generated from the surface of the evaporator, wherein the storage tank is configured to carry out cold storage when the air conditioner operates in cooling mode, wherein the flow rate control valve is configured to stop the flow rate of cooling water circulating from the engine to the heater core such that the air flow across the evaporator is cooled, the air flow across the heater core cools the cooling water contained inside the heater core, and the cooled cooling water contained inside the heater core flows into the storage tank, and wherein the storage tank is configured to carry out heat storage when the air conditioner operates in heating mode, wherein the flow rate control valve is configured to permit the flow rate of cooling water circulating from the engine to the heater core such that the air flow across the evaporator and the heater core is heated, and the heated cooling water heated and supplied by the engine heats the cooling water of the storage tank.

2. The air conditioner according to claim 1, wherein the storage tank comprises a plurality of partition parts disposed therein for forming a flow channel of the heat carrier so as to enhance a heat exchange performance of the heat carrier.

3. The air conditioner according to claim 2, wherein at least one of the partition parts is arranged directly beneath the surface contact part.

4. The air conditioner according to claim 2, wherein the partition part is inclined in a flow channel direction of the heat carrier in such a fashion that a cross sectional area of the flow channel of the heat carrier becomes narrower near the surface contact part.

5. The air conditioner according to claim 2, wherein the storage tank comprises at least one baffle which protrudes from the partition part.

6. The air conditioner according to claim 5, wherein the baffle extends inclinedly along a flow direction of the heat carrier from a side wall of the partition part.

7. The air conditioner according to claim 5, wherein the baffle is in a zigzag form.

8. The air conditioner according to claim 1, wherein the storage tank comprises heat-exchanging means mounted therein for exchanging heat between refrigerant circulating the evaporator and the heat carrier contained in the storage tank.

9. The air conditioner according to claim 8, wherein the heat-exchanging means is formed in such a way that a refrigerant pipe connected to the evaporator is mounted to go through the inside of the storage tank.

10. The air conditioner according to claim 9, wherein the refrigerant pipe going through the storage tank is an outlet pipe of the evaporator.

11. The air conditioner according to claim 9, wherein the refrigerant pipe going through the storage tank is formed along the flow channel of the heat carrier inside the storage tank.

12. The air conditioner according to claim 1, wherein the surface contact part comprises a drain hole for smoothly draining condensate water generated from the evaporator.

* * * * *